United States Patent
Lee et al.

(10) Patent No.: US 12,330,584 B1
(45) Date of Patent: Jun. 17, 2025

(54) HEIGHT ADJUSTABLE SEATBELT BUCKLE

(71) Applicant: GM GLOBAL TECHNOLOGY OPERATIONS LLC, Detroit, MI (US)

(72) Inventors: Minsu Lee, Gyeonggi-do (KR); Jaewoong Lee, Seoul (KR); Jeasu Kim, Incheon (KR); Jongsuk An, Incheon (KR)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/680,863

(22) Filed: May 31, 2024

(51) Int. Cl.
B60R 22/20 (2006.01)

(52) U.S. Cl.
CPC .................. B60R 22/206 (2013.01)

(58) Field of Classification Search
CPC ... B60R 22/206; B60R 22/201; B60R 22/202; B60R 22/203; B60R 22/20
See application file for complete search history.

(56) References Cited

U.S. PATENT DOCUMENTS

| | | | | |
|---|---|---|---|---|
| 6,079,744 | A * | 6/2000 | Husby ................... | G01D 5/147 280/801.1 |
| 6,851,713 | B2 * | 2/2005 | Mattes .............. | B60R 21/01546 280/801.1 |
| 2010/0314930 | A1 * | 12/2010 | Akaike .............. | A44B 11/2523 24/593.1 |
| 2019/0241151 | A1 * | 8/2019 | Vega ....................... | B60R 22/26 |

FOREIGN PATENT DOCUMENTS

| | | | |
|---|---|---|---|
| DE | 102019102741 A1 | 8/2019 | |
| EP | 1223087 A1 * | 7/2002 | ......... A44B 11/2503 |
| JP | H0959172 U * | 8/1994 | |

OTHER PUBLICATIONS

Inner Belt With Storage Function, Aug. 16, 1994, EPO, JP H06-59172 U, Machine Translation of Description (Year: 1994).*
Pascal Zych, Belt Buckle Of A Seat Belt, Especially For A Motor Vehicle, Jul. 17, 2002, EPO, EP 1 223 087 A1, Machine Translation of Description (Year: 2002).*
German Office Action from counterpart DE1020241214988, dated Apr. 25, 2025.

* cited by examiner

Primary Examiner — James A English (57) ABSTRACT

A seatbelt assembly including: a buckle defining a receptacle configured to receive a striker therein; a back plate of the buckle defining a first aperture; a support post to which the back plate is slidably mounted defining a second aperture; and a stopper within the buckle movable between a retracted position and an extended position, in the retracted position the stopper is outside of both the receptacle and the first aperture, and in the extended position the stopper extends through the receptacle and through the first aperture. The buckle is movable along the support post between a raised position and a lowered position, in the lowered position with the stopper in the extended position the tip of the stopper is seated within the second aperture of the support post to lock the buckle in the lowered position.

19 Claims, 6 Drawing Sheets

HEIGHT ADJUSTABLE SEATBELT BUCKLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a height adjustable seatbelt buckle.

Seatbelts are safety devices configured to restrict movement of a seat occupant relative to the seat. Seatbelts are commonly used in automobiles and other vehicles. The distance that a seatbelt buckle protrudes from a seat is relevant to child car seat attachment and various regulations, and may affect ingress and/or egress.

SUMMARY

The present disclosure includes in various features, a seatbelt assembly including: a buckle defining a receptacle configured to receive a striker therein; a back plate of the buckle defining a first aperture; a support post to which the back plate is slidably mounted, the support post defining a second aperture; and a stopper within the buckle, the stopper movable between a retracted position and an extended position, in the retracted position the stopper is outside of both the receptacle and the first aperture, and in the extended position the stopper extends through the receptacle and through the first aperture such that a tip of the stopper is on a side of the back plate opposite to the receptacle. The buckle is movable along the support post between a raised position and a lowered position, in the lowered position with the stopper in the extended position the tip of the stopper is seated within the second aperture of the support post to lock the buckle in the lowered position.

In further features, the buckle includes a button configured such that actuation of the button moves the stopper from the extended position to the retracted position, thereby unlocking the buckle to allow the buckle to move from the lowered position to the raised position.

In further features, a biasing member is configured to bias the buckle in the raised position; upon actuation of the button to move the stopper from the extended position to the retracted position, the biasing member moves the buckle upward along the support post from the lowered position to the raised position.

In further features, in the extended position the stopper is configured to cooperate with the striker seated within the receptacle to lock the striker within the receptacle.

In further features, the support post defines a channel extending along a length of the support post; and a coupling member connects the back plate to the support post, the coupling member is seated within the channel and is slidably movable along the channel.

In further features, the second aperture and the channel are connected.

In further features, the tip of the stopper is chamfered and configured to slide along the support post as the buckle moves from the lowered position to the raised position.

In further features, the support post is made of steel.

In further features, the back plate and the support post extend in parallel.

In further features, the support post includes a tapered upper end with an angled surface on an inside of the support post facing the back plate.

The present disclosure includes, in various features, a seatbelt assembly including: a striker defining a striker aperture; a buckle defining a receptacle configured to receive the striker therein, and defining a buckle aperture; a support post to which the buckle is slidably mounted, the support post defining a post aperture; and a stopper within the buckle, the stopper movable between an unlocked position and a locked position, in the unlocked position the stopper is outside of both the receptacle and the buckle aperture, and in the locked position the stopper extends through the receptacle, through the striker aperture when the striker is seated in the receptacle, and through the buckle aperture. The buckle is movable along the support post between a raised position and a lowered position, in the lowered position with the stopper in the locked position the stopper is seated within the post aperture to lock the buckle in the lowered position.

In further features, the support post is made of a metallic material.

In further features, a spring is configured to bias the buckle in the raised position.

In further features, a tip of the stopper is chamfered and configured to slide along an inner surface of the support post as the buckle moves between the raised position and the lowered position.

In further features, the buckle further includes a rigid backplate mounted to the support post with coupling members seated within a channel defined by the support post.

In further features, the rigid backplate and the support post extend in parallel.

The present disclosure also includes, in various features, a seatbelt assembly including: a striker defining a striker aperture; a buckle defining a receptacle configured to receive a striker therein; a back plate of the buckle defining a back plate aperture; a support post defining a post aperture, extending parallel to the back plate, and made of a metallic material, the back plate is slidably mounted to the support post; and a stopper within the buckle, the stopper including a chamfered tip and movable between an unlocked position and a locked position, in the unlocked position the stopper is outside of both the receptacle and the back plate aperture, and in the locked position the stopper extends through the receptacle, through the striker aperture when the striker is seated in the receptacle, and through the back plate aperture such that the chamfered tip of the stopper is on a side of the back plate opposite to the receptacle. The back plate is movable along the support post between a raised position and a lowered position, in the lowered position with the stopper in the extended position the chamfered tip of the stopper is seated within the support post aperture to lock the buckle in the lowered position.

In further features, a spring extends between the support post and the buckle, the spring configured to bias the buckle in the raised position.

In further features, the support post includes a tapered upper end with an angled surface on an inside of the support post facing the back plate; and the chamfered tip is configured to slide along the support post as the buckle moves from the lowered position to the raised position.

In further features, the support post defines a channel extending along a length of the support post; and a coupling member connects the back plate to the support post, the coupling member is seated within the channel and is slidably movable along the channel.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure includes a seatbelt assembly with a height-adjustable buckle. The buckle is movable along a support post between a raised position and a lowered position. The support post is made of any suitable rigid material, such as steel. The buckle defines a receptacle configured to receive a seatbelt striker therein. Connected to the striker is a strap, which is configured to extend across an occupant's waist and/or chest.

Prior to locking the striker into the buckle, the buckle is typically in the raised position. In the raised position the buckle is supported above the seat, which allows the buckle to be readily located (particularly in low light conditions). In the raised position it is also easier to insert the striker into a receptacle defined by the buckle. The rigid support post firmly holds the buckle in the raised position, which further facilitates insertion of the striker into the buckle, particularly when using only one hand.

Upon insertion of the striker into the buckle, the buckle is configured to lock the striker in the buckle. The buckle is further configured to be slid downward along a length of the support post from a raised position to a lowered position. In the lowered position, the buckle only slightly protrudes from the seat, or is recessed within a pocket defined by the seat. In the lowered position the buckle accommodates a child's car seat on the seat, and satisfies height limits that may be imposed by regulation.

Figure 1:
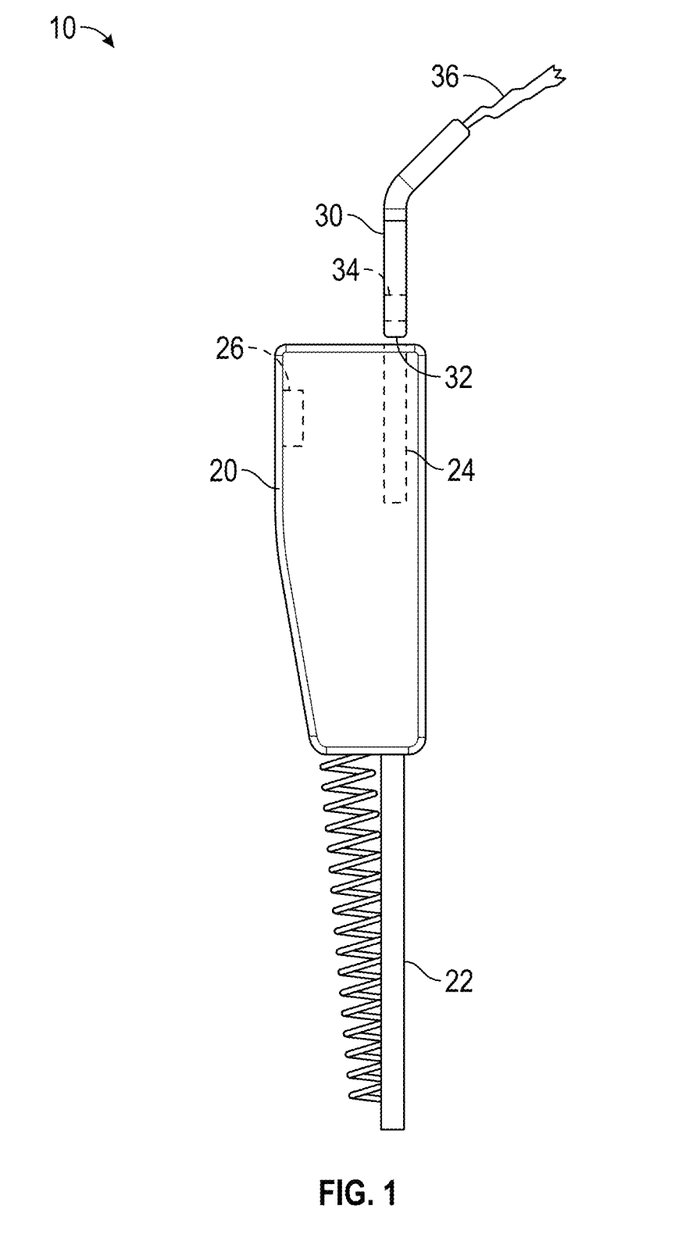
FIG. 1 is a side view of a seatbelt assembly in accordance with the present disclosure.

FIG. 1 illustrates a seatbelt assembly 10 in accordance with the present disclosure. The seatbelt assembly 10 is configured to be installed at any suitable seat, such as a seat of an automobile. The seatbelt assembly 10 may be configured for use in any suitable non-automotive applications as well.

The seatbelt assembly 10 includes a buckle 20 slidably mounted to a support post 22. The support post 22 is made of any suitable rigid material, such as steel, for example. The buckle 20 defines a receptacle 24 configured to receive a striker 30 therein. The buckle 20 is configured in any suitable manner to lock the striker 30 to the buckle 20 within the receptacle 24. The buckle 20 further includes a button 26. The button 26 is configured in any suitable manner such that actuation of the button unlocks the buckle to permit the striker 30 to be removed out from within the receptacle 24 of the buckle 20.

The striker 30 includes a distal end 32, which is configured to be inserted into the receptacle 24. The striker 30 defines a striker aperture 34, which may be defined near the distal end 32. The striker aperture 34 is configured to cooperate with any suitable locking mechanism of the buckle 20 to secure the striker 30 within the buckle 20. Extending from an end of the striker 30 opposite to the distal end 32 is a strap 36, which is configured to extend across a mid-section and/or chest of a person seated in a seat associated with the seatbelt assembly 10.

Figure 2:
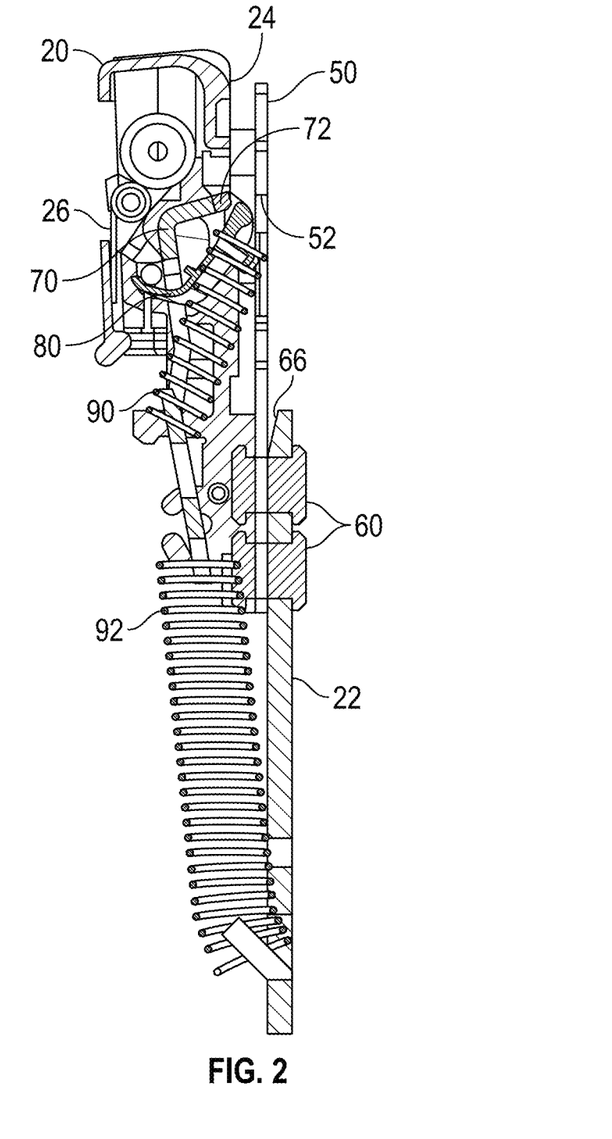
FIG. 2 is a cross-sectional view of a buckle of the seatbelt assembly of FIG. 1 in a raised position.

With continued reference to FIG. 1 and additional reference to FIG. 2, the seatbelt assembly 10 further includes a back plate 50 of the buckle 20. The back plate 50 is a rigid plate made of any suitable material, such as steel. The back plate 50 defines a buckle aperture 52, which may also be referred to as a first aperture.

The back plate 50 connects the buckle 20 to the support post 22. The back plate 50 is connected to the support post 22 in any suitable manner that permits the back plate 50 (and the buckle 20) to slide up and down along the support post 22. The back plate 50 may be connected to the support post 22 by coupling members 60, which may take the form of rivets. The coupling members 60 are connected to the back plate 50 and seated within a channel 62 (FIGS. 3B and 4B) defined by the support post 22. The channel 62 extends along a length of the support post 22. Near a top of the support post 22 is a support post aperture 64, which may also be referred to as a second aperture. The support post aperture 64 may be integrated with the channel 62, or spaced apart from the channel 62.

Both the buckle aperture 52 and the support post aperture 64 are configured to cooperate with a stopper 70 of the buckle 20. The stopper 70 includes a stopper tip 72 at a distal end thereof. The stopper tip 72 is chamfered, as explained further herein. The stopper 70 is movable between a retracted position and an extended position, which is a locked position. In the retracted position, the stopper is spaced apart from, and does not extend into, the receptacle 24, the buckle aperture 52, or the support post aperture 64. In the extended or locked position, the stopper 70 extends through the receptacle 24 and through the buckle aperture 52. In the extended or locked position, the stopper tip 72 protrudes out from within the buckle aperture 52 such that the stopper tip 72 is on a side of the back plate 50 opposite to the receptacle 24 (FIGS. 3A, 3B, 4A, 4B).

The buckle 20 further includes a lever 80. The lever 80 is in cooperation with the stopper 70 such that rotation of the lever 80 moves the stopper 70 between the retracted position and the extended or locked position. A first biasing member 90 biases the lever 80 in the position of FIG. 2, which maintains the stopper 70 in the retracted position. The first biasing member 90 may be a spring or any other suitable biasing member.

Figure 3A:
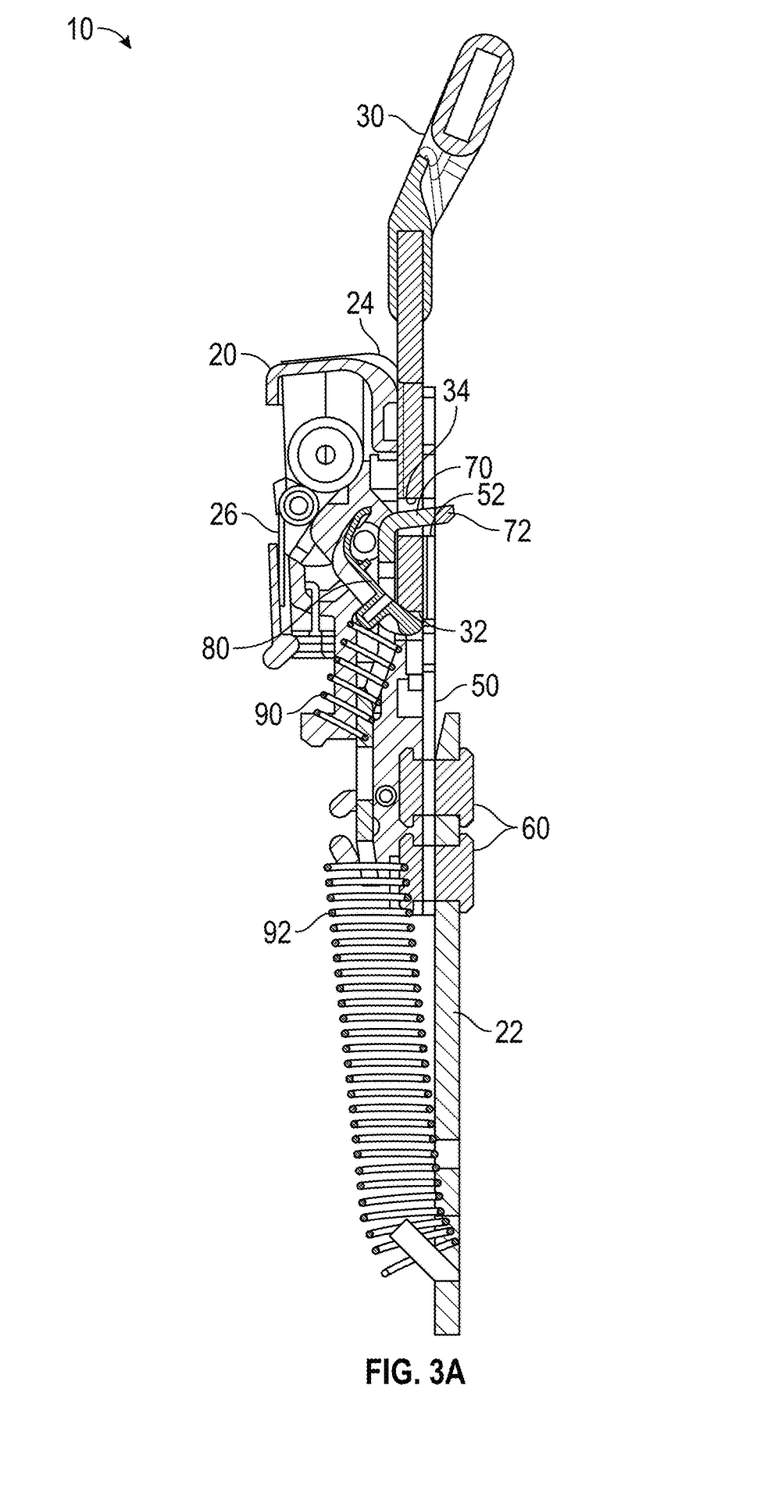
FIG. 3A is a cross-sectional view of the buckle of the seatbelt assembly of FIG. 1 in the raised position and in cooperation with a striker of the seatbelt assembly.
Figure 3B:
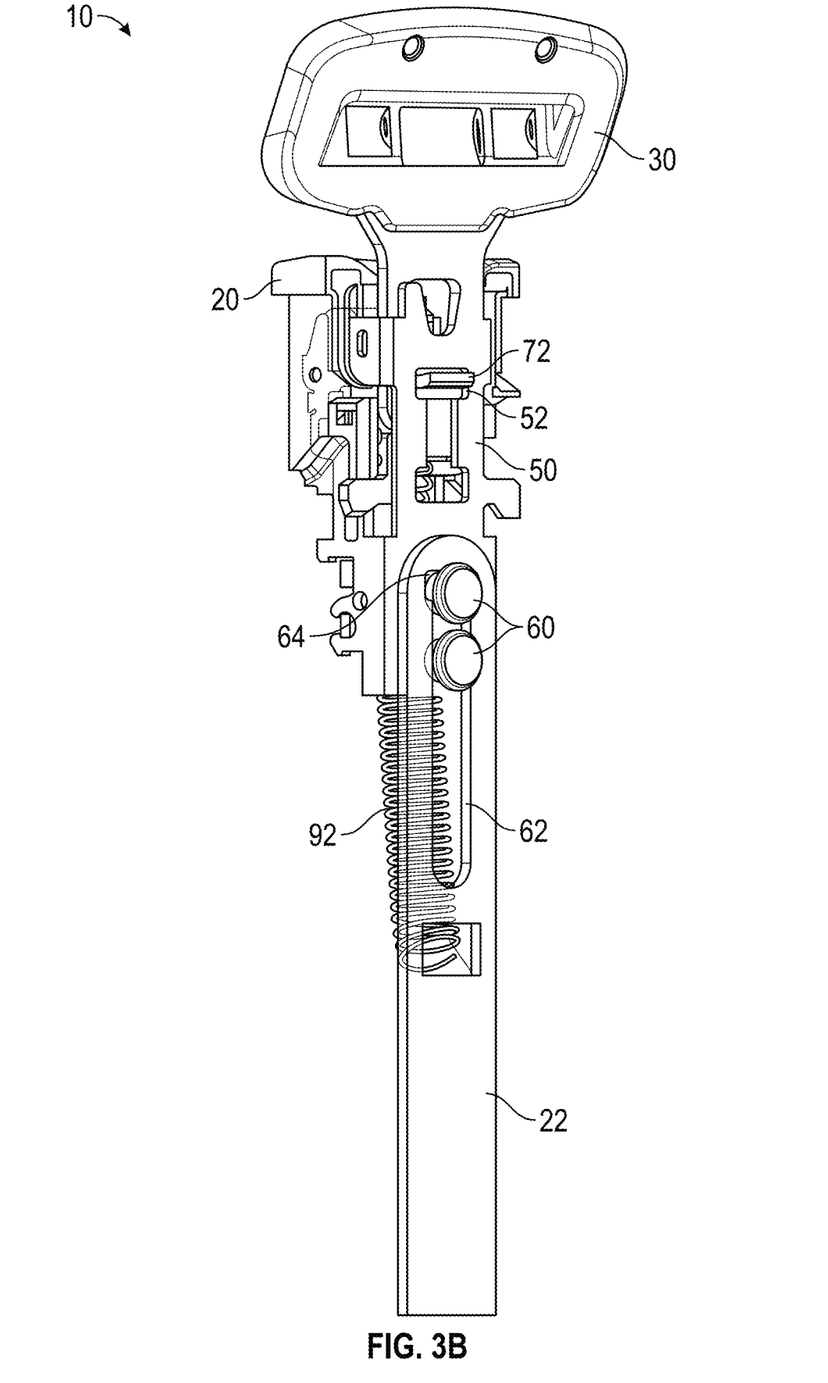
FIG. 3B illustrates the seatbelt assembly rotated from the orientation of FIG. 3A.
Figure 4A:
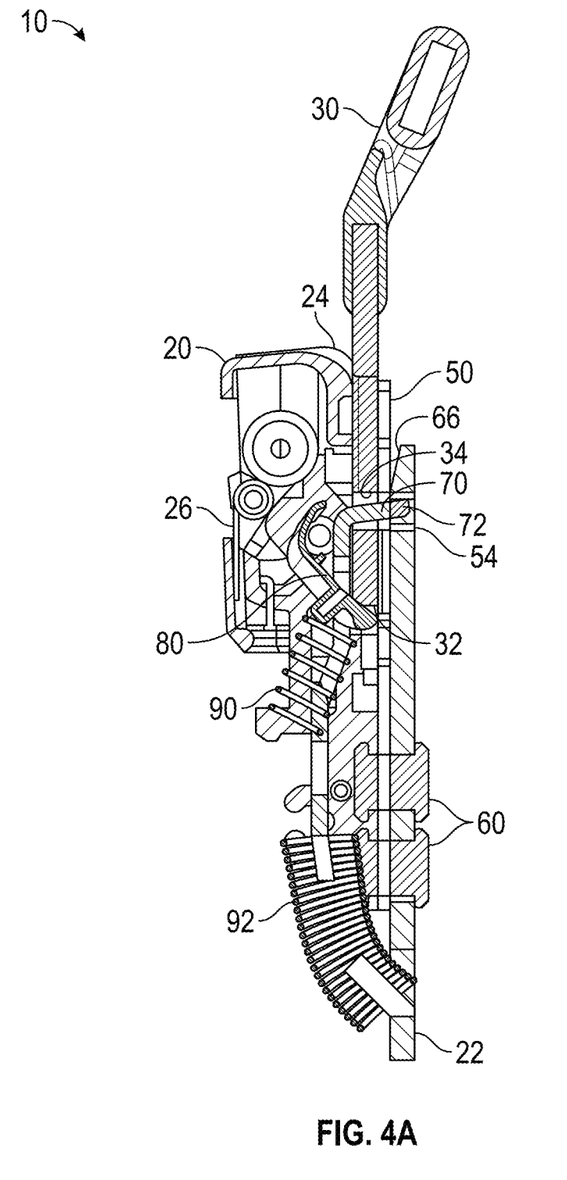
FIG. 4A is a cross-sectional view of the buckle of the seatbelt assembly of FIG. 1 in a lowered position and in cooperation with the striker of the seatbelt assembly.
Figure 4B:
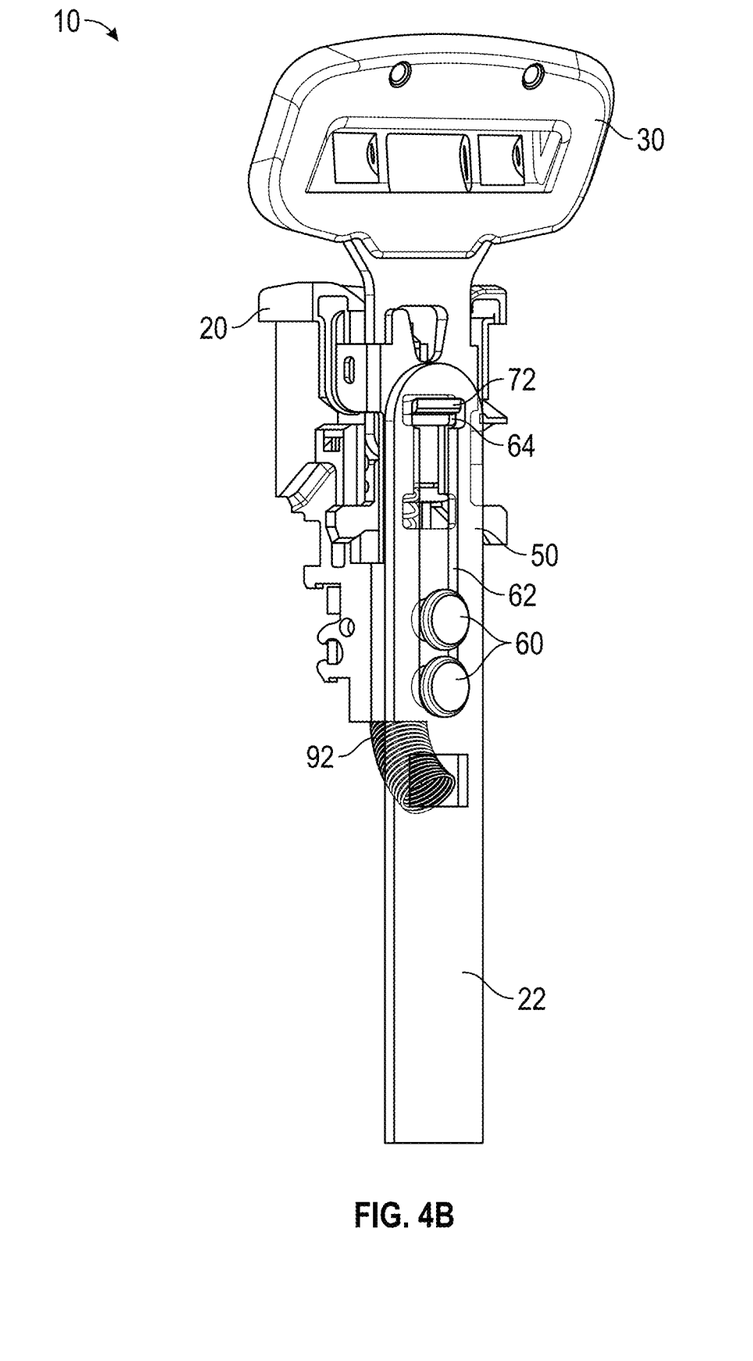
FIG. 4B illustrates the seatbelt assembly rotated from the orientation of FIG. 4A.

The buckle 20 is movable between a raised position of FIGS. 2, 3A, and 3B, and a lowered position of FIGS. 4A and 4B. This movement of the buckle 20, as well as general operation of the seatbelt assembly 10, will now be described further. FIGS. 3A and 3B illustrate the buckle 20 in the raised position with the striker 30 locked within the receptacle 24. Upon insertion of the striker 30 within the receptacle 24, the distal end 32 of the striker 30 contacts the lever 80. As the striker 30 is pushed deeper into the receptacle 24, the distal end 32 pushes against the lever 80 to rotate or otherwise move the lever 80 to the position of FIG. 3A, which moves the stopper 70 from the retracted position of FIG. 2 to the extended position of FIGS. 3A, 3B, 4A, 4B. As the stopper 70 moves to the extended position, the stopper 70 moves into the striker aperture 34 and into the buckle aperture 52, which locks the striker 30 within the buckle 20. Thus, in the raised position of FIGS. 3A and 3B, the striker 30 extends through the receptacle 24, through the striker aperture 34, and through the buckle aperture 52.

Inserting the striker 30 into the receptacle 24 while the buckle 20 is in the raised position of FIGS. 3A and 3B facilitates location of the receptacle 24, particularly under low light conditions. Being supported by the rigid, metallic support post 22 further facilitates one-hand coupling of the striker 30 to the buckle 20. The buckle 20 is maintained in the raised position by a biasing member 92, which may be a spring or any other suitable biasing member. The biasing member 92 extends from the support post 22 to the buckle 20.

To move the buckle 20 from the raised position of FIGS. 3A and 3B to the lowered position of FIGS. 4A and 4B, the buckle 20 is pushed downward to slide the buckle 20 down along the support post 22. As the buckle 20 is pushed downward, the coupling members 60 slide down the channel 62 and the stopper tip 72 contacts an inner surface 66 of the support post 22. The inner surface 66 is angled to facilitate movement of the stopper tip 72 along the inner surface 66. The buckle 20 is pushed down further until the stopper tip 72 reaches the support post aperture 64. At the support post aperture 64, the stopper tip 72 is biased to move outward into the support post aperture 64 to lock the buckle 20 in the lowered position of FIGS. 4A and 4B.

The seatbelt assembly 10 may be installed such that in the lowered position of FIGS. 4A and 4B little, if any, of the buckle 20 protrudes upward from the seat. In the lowered position, the seatbelt assembly 10 is configured to accommodate a child's car seat, as well as satisfy seatbelt buckle height regulations that may be applicable. The lowered position of FIGS. 4A and 4B illustrates the striker 30 as locked within the buckle 20. In other applications, however, the buckle 20 may be locked in the lowered position without the striker 30 being locked within the buckle 20.

To raise the buckle 20 from the lowered position of FIGS. 4A and 4B to the raised position of FIGS. 3A and 3B, and to decouple the striker 30 from cooperation with the buckle 20, the button 26 is depressed. Pressing the button 26 unlocks the lever 80 from the position of FIGS. 4A and 4B, which allows the lever 80 to rotate back to the position of FIGS. 3A and 3B. Such rotation of the lever 80 is facilitated by the first biasing member 90, which is biased in the position of FIG. 2. As the lever 80 moves to the position of FIG. 2, the stopper 70 moves from the extended position inward and out of the support post aperture 64. Because the stopper 70 is no longer seated in the support post aperture 64, the buckle 20 is free to rise from the lowered position to the raised position.

The biasing member 92 is biased to move the buckle 20 upward to the raised position of FIGS. 3A and 3B. As the buckle 20 moves upward, the chamfered stopper tip 72 slides along the inner surface 66 of the support post 22. This contact between the stopper tip 72 and the inner surface 66 regulates and slows movement of the buckle 20 to prevent any abrupt upward movement of the buckle 20 that may be caused by the biasing member 92. The buckle 20 continues to move upward until it returns to the raised position of FIG. 2. As a result of pressing of the button 26, the stopper 70 returns to the retracted position of FIG. 2, in which the stopper 70 is no longer within the receptacle 24 and thus no longer within the striker aperture 34. The striker aperture 34 is thus free to be removed from within the receptacle 24.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A seatbelt assembly comprising:
    a buckle defining a receptacle configured to receive a striker therein;
    a back plate of the buckle defining a first aperture;
    a support post to which the back plate is slidably mounted, the support post defining a second aperture; and
    a stopper within the buckle, the stopper movable between a retracted position and an extended position, in the retracted position the stopper is outside of both the receptacle and the first aperture, and in the extended position the stopper extends through the receptacle and through the first aperture such that a tip of the stopper is on a side of the back plate opposite to the receptacle, wherein the buckle is movable along the support post between a raised position and a lowered position, in the lowered position with the stopper in the extended position the tip of the stopper is seated within the second aperture of the support post to lock the buckle in the lowered position, and wherein the support post includes a tapered upper end with an angled surface on an inside of the support post facing the back plate.

2. The seatbelt assembly of claim 1, wherein the buckle further includes a button configured such that actuation of the button moves the stopper from the extended position to the retracted position, thereby unlocking the buckle to allow the buckle to move from the lowered position to the raised position.

3. The seatbelt assembly of claim 2, further comprising a biasing member configured to bias the buckle in the raised position, wherein upon actuation of the button to move the stopper from the extended position to the retracted position, the biasing member moves the buckle upward along the support post from the lowered position to the raised position.

4. The seatbelt assembly of claim 1, wherein in the extended position the stopper is configured to cooperate with the striker seated within the receptacle to lock the striker within the receptacle.

5. The seatbelt assembly of claim 1, wherein:
the support post defines a channel extending along a length of the support post; and
a coupling member connects the back plate to the support post, the coupling member is seated within the channel and is slidably movable along the channel.

6. The seatbelt assembly of claim 5, wherein the second aperture and the channel are connected.

7. The seatbelt assembly of claim 1, wherein the tip of the stopper is chamfered and configured to slide along the support post as the buckle moves from the lowered position to the raised position.

8. The seatbelt assembly of claim 1, wherein the support post is made of steel.

9. The seatbelt assembly of claim 1, wherein the back plate and the support post extend in parallel.

10. A seatbelt assembly comprising:
a striker defining a striker aperture;
a buckle defining a receptacle configured to receive the striker therein, and defining a buckle aperture;
a support post to which the buckle is slidably mounted, the support post defining a post aperture; and
a stopper within the buckle, the stopper movable between an unlocked position and a locked position, in the unlocked position the stopper is outside of both the receptacle and the buckle aperture, and in the locked position the stopper extends through the receptacle, through the striker aperture when the striker is seated in the receptacle, and through the buckle aperture, wherein the buckle is movable along the support post between a raised position and a lowered position, in the lowered position with the stopper in the locked position the stopper is seated within the post aperture to lock the buckle in the lowered position, and wherein the support post includes a tapered upper end with an angled surface on an inside of the support post facing the buckle.

11. The seatbelt assembly of claim 10, wherein the support post is made of a metallic material.

12. The seatbelt assembly of claim 10, further comprising a spring configured to bias the buckle in the raised position.

13. The seatbelt assembly of claim 10, wherein a tip of the stopper is chamfered and configured to slide along an inner surface of the support post as the buckle moves between the raised position and the lowered position.

14. The seatbelt assembly of claim 10, wherein the buckle further includes a rigid backplate mounted to the support post with coupling members seated within a channel defined by the support post.

15. The seatbelt assembly of claim 14, wherein the rigid backplate and the support post extend in parallel.

16. A seatbelt assembly comprising:
a striker defining a striker aperture;
a buckle defining a receptacle configured to receive the striker therein;
a back plate of the buckle defining a back plate aperture;
a support post defining a post aperture, extending parallel to the back plate, and made of a metallic material, the back plate is slidably mounted to the support post; and
a stopper within the buckle, the stopper including a chamfered tip and movable between an unlocked position and a locked position, in the unlocked position the stopper is outside of both the receptacle and the back plate aperture, and in the locked position the stopper extends through the receptacle, through the striker aperture when the striker is seated in the receptacle, and through the back plate aperture such that the chamfered tip of the stopper is on a side of the back plate opposite to the receptacle, wherein the back plate is movable along the support post between a raised position and a lowered position, in the lowered position with the stopper in the locked position the chamfered tip of the stopper is seated within the post aperture to lock the buckle in the lowered position, wherein the support post includes a tapered upper end with an angled surface on an inside of the support post facing the back plate.

17. The seatbelt assembly of claim 16, further comprising a spring extending between the support post and the buckle, the spring configured to bias the buckle in the raised position.

18. The seatbelt assembly of claim 17, wherein
the chamfered tip is configured to slide along the support post as the buckle moves from the lowered position to the raised position.

19. The seatbelt assembly of claim 16, wherein:
the support post defines a channel extending along a length of the support post; and
a coupling member connects the back plate to the support post, the coupling member is seated within the channel and is slidably movable along the channel.

* * * * *